(12) United States Patent
Efraimsson et al.

(10) Patent No.: US 8,139,383 B2
(45) Date of Patent: Mar. 20, 2012

(54) POWER STATION FOR POWER TRANSMISSION TO REMOTELY LOCATED LOAD

(75) Inventors: Lars Efraimsson, Falun (SE); Henric Magnusson, Falun (SE); Ulf Fridtjof Johnsen, Falun (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 378 days.

(21) Appl. No.: 12/598,809

(22) PCT Filed: May 4, 2007

(86) PCT No.: PCT/SE2007/050303
§ 371 (c)(1),
(2), (4) Date: Nov. 4, 2009

(87) PCT Pub. No.: WO2008/136716
PCT Pub. Date: Nov. 13, 2008

(65) Prior Publication Data
US 2010/0141232 A1    Jun. 10, 2010

(51) Int. Cl.
*H02H 7/00* (2006.01)
(52) U.S. Cl. .............................. 363/51; 363/35; 361/107
(58) Field of Classification Search .................... 363/35, 363/50, 51; 307/104, 132 E, 132 EA; 361/19, 361/93.9, 107, 115
See application file for complete search history.

(56) References Cited

U.S. PATENT DOCUMENTS

| | | | | |
|---|---|---|---|---|
| 4,057,736 A * | 11/1977 | Jeppson | ........................... | 307/78 |
| 5,550,410 A * | 8/1996 | Titus | ............................... | 290/52 |
| 7,724,482 B2 * | 5/2010 | Folts et al. | ...................... | 361/19 |
| 2002/0176265 A1 * | 11/2002 | Oates | ............................... | 363/35 |
| 2004/0212353 A1 * | 10/2004 | Nelson | ............................. | 322/45 |

* cited by examiner

*Primary Examiner* — Jessica Han
(74) *Attorney, Agent, or Firm* — Roger S. Burleigh

(57) ABSTRACT

The invention relates to distribution of electrical power, supervision and security. The invention comprises a power feeding station PFS for delivering electrical power. The PFS comprises a low voltage side LVS, a high voltage side HVS and a transformer TF which is configured to deliver high voltage single phase alternating current on the high voltage side, The power can be distributed, via a cable, to one or more power receiving stations PRS. The cable is configured to distribute current-symmetrical single phase current delivered by the power feeding station. The cable can preferable be a coaxial cable with the shield as current return path. The invention also comprises a current sensor unit CSU which is situated on the high voltage side. The means for measuring characteristics of the current CD can comprise a coil without galvanic contact with the high voltage side. A circuit break unit CBU suitable for breaking the current is situated on the low voltage side. A control function CF is configured to activate the circuit break unit based on the safety rules and the characteristics of the current CD. Characteristics of the current and other system information SI can also be delivered to an information unit IU.

11 Claims, 2 Drawing Sheets

POWER STATION FOR POWER TRANSMISSION TO REMOTELY LOCATED LOAD

TECHNICAL FIELD

The present invention relates to distribution of power. In more detail it relates to distribution of electrical power, supervision and security.

BACKGROUND

It is sometimes desirable to supply electrical power to consumers situated far away from electrical power infrastructures. There are several solutions to this problem. One way to get electrical power is to have locally placed engine generators. Sometimes three phase high voltage distribution lines are used. A system called SWER, Single Wire Earth Return, use a one phase single wire cable. It can transmit single phase high voltage current from 6 kV to 19.1 kV. It is made for power up to 500 kW.

Problems that occur in these solutions normally relates to resistive voltage drop, sensibility to disturbances and detection of faults, e.g. earth fault detection, phase fault and loosing of phases. Some systems are complicated and costs and maintenance can sometimes be an important issue. The solutions can also have problems to comply with local authorities safety regulations.

One example of small power consumers that could be situated in places far away from electrical infrastructure is telecom equipment, such as radio base stations. Two diesel generators with back up batteries are often used for locally produced power. This requires a costly maintenance organisation and the sites operational reliability is dependent on a well-functional logistic organisation and accessibility to these sites. Sometimes a high-voltage distribution system has been used, e.g. 12 kV or 24 kV three phase distribution line. For shorter distances 1 kV is sometimes used.

The purpose of the inventions is to overcome the disadvantages described above.

SUMMARY

The invention relates to distribution of electrical power, supervision and security. The invention comprises a power feeding station PFS for delivering electrical power. The PFS comprises a low voltage side LVS, a high voltage side HVS and a transformer TF which is configured to deliver high voltage single phase alternating current on the high voltage side, The power can be distributed, via a cable, to one or more power receiving stations PRS. The cable is configured to distribute current-symmetrical single phase current delivered by the power feeding station. The cable can preferable be a coaxial cable with the shield as current return path.

The invention also comprises a current sensor unit CSU which comprises means CL, 105 for measuring characteristics of the current CD, means 106 to receive characteristics of the current and means 101 to deliver the characteristics of the current to a control function CF. The current sensor is situated on the high voltage side. The means for measuring characteristics of the current CD can comprise a coil without galvanic contact with the high voltage side.

A circuit break unit CBU suitable for breaking the current is situated on the low voltage side. The control function CF is configured to activate the circuit break unit based on the safety rules and the characteristics of the current CD.

The control function CF comprises means for receiving characteristics of the current and means for activate the circuit break unit.

The means for measuring characteristics of the current can also comprise means 105 for measuring a value of the earth leakage current from the power cable shield to a surrounding material and means CL for measuring the cable shield current. The supervision system can then measure characteristics of the current consisting of the phase angle between the earth leakage current and the cable shield current and take said phase angle into consideration for activation of the circuit breaker unit.

Characteristics of the current and other system information SI can also be delivered to an information unit IU.

The invention will now be described more in detail with the aid of preferred embodiments in connection with the enclosed drawings.

DETAILED DESCRIPTION

Remote power RPS is a power solution providing an easy, safe and cost effective way to take care of the power supply to power consumers, e.g. telecom units, which are located at long distances from existing electrical supply network and spread over a wide geographical area. The system works properly even at distances up to 100 km. The power can preferably be between 1-1000 kW. The system is less prone to pick up outer disturbances like magnetic interference, has a sensible supervision system and provides a high degree of personnel safety. Central reserve power can be used and the need for reserve power and batteries back up for the power consumer is minimal. It is a robust and reliable system with little electrical equipment on the high voltage side.

Figure 1:
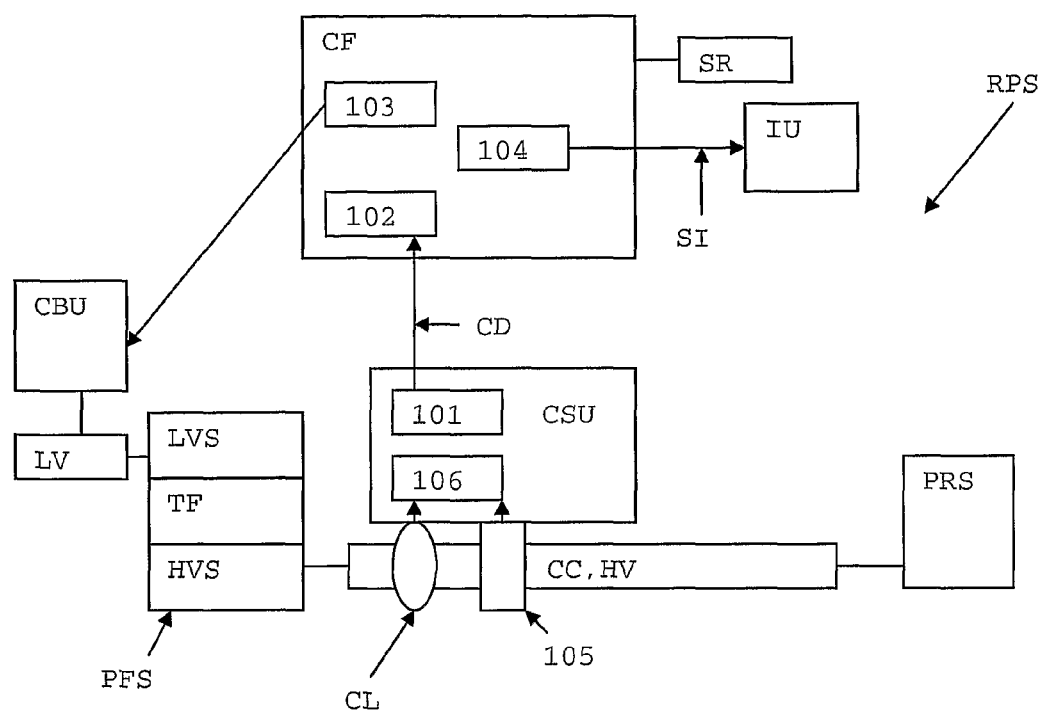
FIG. 1 describes a Remote Power System with one Power Receiving Station.

FIG. 1 illustrates a remote power system RPS comprising a power feeding station PFS which has a low voltage side LVS and a high voltage side HVS and a transformer TF, a high voltage distribution cable CC for transporting power between the PFS and the PRS, a power receiving station PRS, a current sensor unit CSU for measuring characteristics of the current CD on the high voltage side and a control function CF which can activate a circuit break unit CBU based on a set of safety rules (SR).

The system comprises a central power feeding station PFS comprising a low voltage side for input of electrical power. The PFS typically gets is electrical power from a central power station or is connected to the existing electrical infrastructure. Input is typically two phase 230-400 volts AC, i.e. low voltage. The PFS also comprises a high voltage side for distribution of power to a power Receiving Station PRS. A transformer TF in the PFS handles the transformation from low to high voltage. Output can be a few kilo volts, 2-20 kilo volts is most appropriate for this embodiment. In the case input current is not single phase, the transformer also transforms the current to single phase. A supervision system for breaking the current in case of malfunctions in the system is connected to the PFS. Supervision and signal equipment can also be connected to the PFS as well as different types of back ups, i.e. a battery back up system. Using high voltage in the distribution phase gives the results of low currents. This makes the system more cost effective and the supervision system more reliable.

The current is distributed through a high voltage distribution power cable, which is adapted for transmitting current-symmetrical single phase current. It can be a cable of co-axial type where the shield (SH) in used as current return path. The cable can preferably be a XLPE insulated cable with coaxial construction with an outer diameter of about 10-30 mm and can be placed in ground, in water or hung in air. The system will work up to at least distances of 100 km. If a coaxial design is used, the magnetic field is negliable and the cable can be placed close to other sensitive equipment, i.e. telecom cables, without risk of magnetic interference. A coaxial design also makes the cable more or less immune to electro magnetic impulses from the outside, like thunder and lightning over-voltages. This is also important to be able to have a sensible and reliable supervision system. A fault detection system will be less affected by outer electro magnetic disturbances.

At the Power Receiving Stations PRS the voltage can be transformed down to low voltage, typically 230 volt AC. Several PRS can be serial connected and there is only need for one backup system and one safety and supervision system, normally situated close to the Power Feeding Station. A ring configuration can also be used. For better performance it is also possible to have several Power Feeding Station connected to a system.

Protection and control is achieved by means of primary low voltage fuses on the low voltage side and circuit breakers. No high voltage fuses are needed. Sensors for fault detection are placed on the high voltage side. The Current Sensor Unit CSU is placed on the high voltage side in the PFS or on the high voltage single phase coaxial cable CC. The CSU does not have to be a central unit but could also be distributed, with different measuring points. The CSU can comprise a coil, CL in FIG. 1, with no galvanic contact with the high voltage side for measuring magnitudes of currents. In the case of a coaxial cable the induced current in the coil is normally quite low. This is because of the symmetrical co-axial construction of the cable. This makes it possible to get the current sensor very sensible. The supervision system can also comprise means for measuring the phase angle between the total cable current, measured by a coil, and the capacitive leakage current. This is to get a sensitive supervision system which can detect the mainly resistive fault currents when the capacitive earth leakage current is large.

The current sensor unit CSU has means for detecting and deliver characteristics of the current CD to a Control Function CF. Examples of characteristics of the current are differences in magnitudes and phase of in- and out going current as well as phase angle between current and voltage.

To avoid expensive and complicated high voltage equipment a circuit break unit CBU is placed on the low voltage side of the Power feeding station PFS. The control function CF can order the CBU to cut the current according to certain safety rules SR and on what Characteristics of the current CD the CSU delivers.

Some examples of characteristics of the current that makes the control function activate the current break unit:
the difference in magnitude between in- and outgoing current is bigger than a trip value D1,
the phase difference between current and voltage is bigger than a value P1,
the magnitude of the current is bigger than C1, The CF can also deliver system information, SI in FIG. 1, to an Information Unit, IU in FIG. 1. The system information can e.g. be information on characteristics of the current (CD) or that the circuit break unit (CBU) has been activated. The IU can be a screen with readable data of the status of the system or different alarm functions. Every kind of defect in the system does not have to result in a cut of the current. If for example the difference in magnitude between in- and outgoing current is bigger than a reference value D2 this could be sent as a signalling message to the information unit. In this case it can be due to the fact that the outer sheath of the coaxial cable is deficient. It is however possible to operate the system with a deficient outer sheath, but it should be repaired before corrosion of the cable shield proceeds. Other examples of information which can be sent to the information unit:
the status of the circuit break unit,
magnitudes of current and voltage,
phase differences between current and voltage.

It is desirable to have a sensible system and at the same time a system that not cut the power without any predictable reason. To get a well function circuit break and signalling system the supervision system is adapted to the specific behaviour of the remote power system.

In the Remote Power network a power cable of coaxial type is normally used and the cable shield is then used as the return path for the currents. The shield has mainly a resistive impedance that causes a voltage drop in the shield.

According to ohm's law the voltage drop is $$U = R * I$$

The inductive part of the shield impedance is here neglected.

This means that it will be a potential difference along the cable shield. A large current and large resistance gives large potential difference along the cable. The voltage in the shield is able to drive currents that will be described below.

The surrounding earth of the power cable works as a conductor for currents, therefore the cable shield conductor and the earth "conductor" will act as a capacitor. The capacitance and the shield voltage will cause capacitive leakage currents that affect the normal symmetry that would occur in a perfect state between the phase and the return current (Total cable current = $\vec{I}_{phase} + \vec{I}_{screen}$).

If the total leakage current is large the trip value for a normal earth fault relay must be set to a large value, hence the sensitivity for the relay is decreased with large leakage currents.

In case of large leakage currents a phase angle sensitive earth fault relay can be used. The relay takes the capacitive leakage current under consideration to increase the sensitivity to the mainly resistive earth fault current. The phase angle sensitive fault detection unit measures the zero sequence voltage over impedance between the transformer neutral and earth. The voltage is dependent on the total current floating in ground. The voltage is used by the relay as a reference value to measure the phase angle of the current in the cable. In case of an earth fault a mainly resistive current will occur in the shield which will change the angle between the zero sequence voltage and the total cable current. The phase angle is used as trip value to give signal to e.g. the IU or the CF. The capacitive currents must be measured or calculated to be able to make the proper adjustments for the relay.

The cable shield and the surrounding earth can be approximated as a cylindrical capacitor, where the inner conductor is the shield and the outer conductor is the earth where the earth current flows. Between the conductors we have two isolation medium, the cable jacket and the earth. The refractive indexes for the mediums are $\in_{jacket}$ depending on the material, e.g. ethylene jacket has the value 2.3.

$\in_{earth}$ is dependent of the moisture condition in ground and is therefore a function of the path along the cable. $\in_{earth} \approx 80$ represent water and $\in_{earth} \approx 10$ could be very dry moisture. A normal average value can typically be 20 for the surrounding ground refractive index.

The capacitance between the shield and the earth can be written as $$C = \frac{2*\pi\varepsilon_0}{\frac{1}{\varepsilon_{jacket}}\ln(b/a) + \frac{1}{\varepsilon_{earth}}\ln(c/b)} * L$$

L is the length of the cable, a the radius to the outer part of the shield, b the radius to the outer part of the jacket and c the radius to the imaginary earth conductor. This is under the assumption that the cable length is very long compared to the radius of the cable [E-field only directed in the radial direction].

Figure 2:
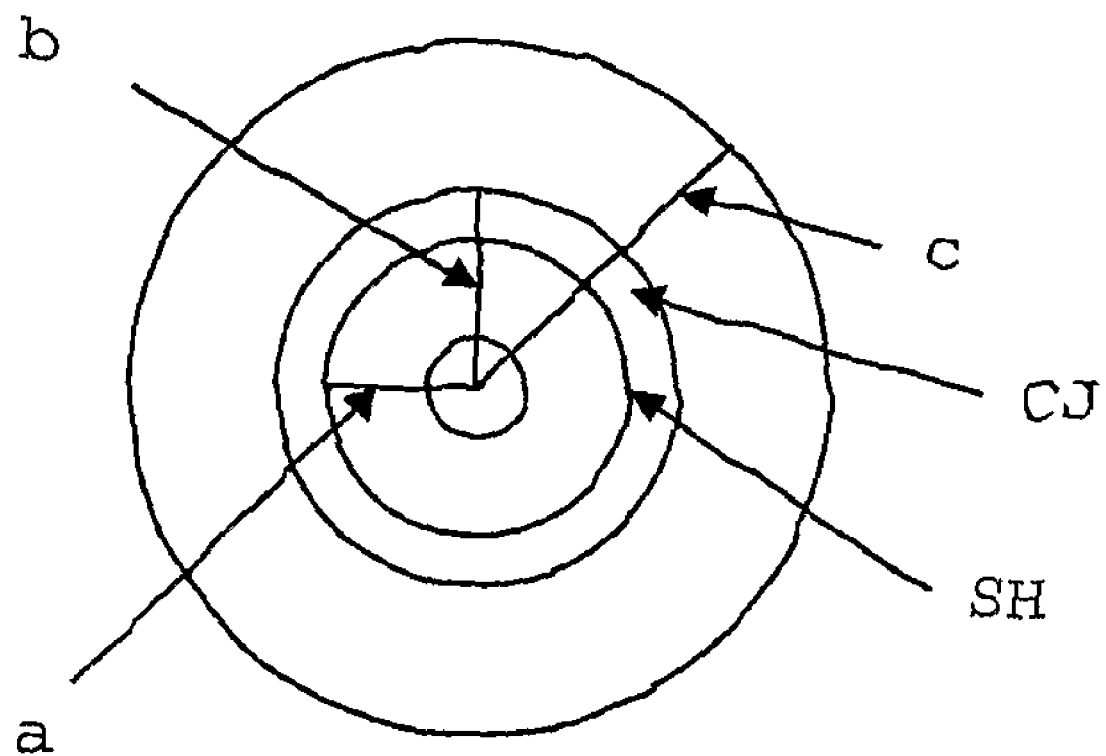
FIG. 2 describes a cross section of a coaxial cable.

FIG. 2 shows a cross section of a cable, the area between a and b is the cable jacket (CJ) and the area between b and c is the ground, air and water. The values a, b are cable dimension but the distance c is not exact and must normally be estimated, the earth currents normally floats at a distance of 20-40 meter from the cable. In the calculations a value of 20 meter is normally used.

The voltage drop in the shield is determined by the shield resistance and the total current floating the cable. The shield resistance, R, is a fixed value dependent on the area of the shield conductor.

The total current is dependent on the active loads in the system, the system voltage and the reactive power produced in the cable. Let's assume that the system has PFS station and one PRS. From the receiving station the total current, I, produced in the network is carried back in the shield to the feeding station. The current has a resistive part and a reactive part caused by capacitive power generation between the cable phase and shield. This causes a voltage drop from the PRS to the PFS, $$U_{max} = R_{screen} * I$$

$$I = \sqrt{\left(\frac{P}{U}\right)^2 + (\omega * C * L * U)^2}$$

P=active load in the system
U=is the system high voltage
L=the cable length between the stations
ω=is the angle frequency
C=capacitance per km [μF/km]

The shield resistance R is fixed for the actual cable used. The voltage drop will cause a potential difference between the stations, when calculating the capacitive leakage currents an average value of the voltage between the stations must be used instead of the total potential difference, the average potential along the cable shield is $$U_{average} = U_{max}/2$$

The capacitive leakage current to earth is determined by the shield voltage, the current frequency and the capacitance between shield and earth $$I_{earth} = \omega * C_{screen-earth} * U_{screen}$$

The total earth current between two stations can now be calculated to get the asymmetry current, capacitive leakage current, between the PFS and the first PRS $$I_{earth} \approx \omega * \frac{\sqrt{(P/U_{phase})^2 + (\omega * C_{phase-screen} * U_{phase})^2} * R_{screen} * L}{2} *$$

$$\int \frac{2\pi\varepsilon_0}{\frac{1}{\varepsilon_{earth}(L)}\ln\left(\frac{b}{a}\right) + \frac{1}{\varepsilon_{jacket}}\ln\left(\frac{c}{b}\right)} dL$$

The concept can of course be used to systems with more than one PRS. The shield voltage will increase along the cable relative to the feeding station but the voltage raise will be smaller and smaller since the active load and reactor power seen from a station further out is smaller, hence less current is carried in the shield further out in the system.

If the cable length is short and the loads are small the voltage drop in the shield will be small. In this case the capacitive leakage current will be relatively small, say 50 mA. On the other hand, when the cable lengths are long the leakage currents are large and the asymmetry current trip value used by the fault detection unit must be set to a large value for not tripping in a normal state mode.

In this case the sensitivity to high impedance earth faults is relatively bad. To increase the sensitivity the phase angle between the capacitive leakage current and the asymmetry current in the cable is used as a trip value. In case of an earth fault mainly resistive currents will occur that will change the phase angle between the currents, the signal is sent to the IU or the CF.

To make the CSU as sensible as possible in terms of detecting characteristics of the current CD related to defects in the system, it is desirable to minimize the capacitive current. This is especially of importance when the capacitive current is of the approximate size of the current in the cable. The material of the cable, the voltage and the frequency of the AC will therefore be adapted to make the capacitive current as small as possible. A lower frequency, i.e. 16⅔ Hz, will reduce the capacitive current to ⅓ of the capacitive current at 50 Hz. Some examples to adapt the configuration of the cable are using a thick isolation on the outside of the cable, using an isolation material with a low dielectricity constant or foaming the isolation material.

There will however always be some capacitive currents and the supervision system can take that current into consideration. The capacitive current will be taken into consideration on determination of a trip value D1. If the cable is damaged or another fault occurs this will cause an additional current that will exceed the trip value D1, and the CBU will be activated. The values of the capacitive current could be either calculated or measured directly at a remote power system.

For e.g. Personnel safety reasons it is desirable to limit the voltage in the shield, which can be high in case of long cable lengths or large currents. In order to do so a phase adjusting device can be connected between the shield and the earth of the PRS. The phase adjusting device is preferable a reactor. The phase adjusting device compensates the capacitive currents, shield to ground, and stabilizes the shield voltage with an impedance to ground. The phase adjusting device is dimensioned to at least compensate the capacitive currents, which depends on the surrounding soil and the shield voltage. Preferable is to place one phase adjusting device in the every PRS. The fault detection unit now measures the inductive currents in earth as reference value for the phase sensitive fault detection. When decreasing the shield voltage with impedances to ground the sensitivity to high ohmic earth faults as the fault current is dependent on the voltage in the fault point before the fault occurs and the impedance seen from that point into the network (I=U/Z). However, low voltage in the shield will avoid human hazard and give a robust system.

If the cable length is long the earth currents can be rather large. A shield to earth fault give rise to mainly an active (resistive) current which can be small compared to the continual capacitive current. To increase the sensitivity for the mainly resistive fault currents the phase angle between the capacitive earth current and the total current over the power cable can be used by the control function as a value for fault detection. In such case an impedance is connected between the PFS earth and the power cable shield. The supervision system comprises means for measuring the voltage over the impedance which is used as a reference value when measuring the phase angle between the capacitive leakage earth current and the total cable current measured by the coil. The circuit break unit CBU is activated when the phase angle between the capacitive and active current exceeds a given value, a typical phase value for tripping could be P1=80 degrees. In a perfect state the angle is around 90 degrees.

Another problem is the start up pulse, of current that occurs when the system is starting up, due to e.g. magnetisation of transformer cores etc. The supervision system can take this phenomenon into consideration by e.g. having a built in time delay T1 for the supervision system in the start up phase. The system will then not react on characteristics of the current that can activate the current break unit. T1 could typically be less than a second.

One example of remote power system will now be described. Incoming power to the power feeding station (PFS) is of 2-phase (phase to phase) 400 Volts AC, at 50 Hz, typically from a 3-phase generator source. A transformer in the PFS transforms the low voltage to single phase 4 kV AC. The electric energy is transmitted between the PFS and the PRS via a high voltage coaxial cable. The distance between the PFS and the PRS is 40 km.

The PRS transforms the high voltage to low voltage, normally 230 Volts AC. The PRS supplies an active load of 10 kW; e.g. the transformer can be rated to 15 kVA. The voltage and capacitance between the conductor and shield will cause capacitive currents in the cable. The current causes active losses, voltage rise at low load, and requires a transformer that can handle a large amount of reactive power. To minimize the losses, the voltage rise and to increase the power capacity a compensating reactor that consumes reactive power is connected, in the PRS, between the phase and shield.

The magnitude of the current in the power cable is approximately between 2.5-5 ampere dependent on the load and the degree of compensation of the conductor-shield capacitive current, say a total of 4 A for the example. The cable is a XLPE insulated power cable of co-axial type with an outer diameter of 20 mm. The cable can be placed in both ground, water and in air.

If the power load exceeds the rated transformer values the circuit breaker unit CBU will be activated. This device will also detect other faults in the system that causes large currents. The safety rules are set to activate the circuit break unit if the current is bigger than C1.

At start up the magnetic configuration of the transformer in the PFS can cause large currents. This current can be limited by a reactor connected in series with the low voltage feeding point. The start up current is damped in a few periods. The reactor is automatically disconnected when the current is stabilized.

The shield in the coaxial cable is used as return path for the currents, but this current will be counteracted by a current in the ground driven by the voltage in the shield.

The shield has a resistance of approximately 2 ohm/km which give rise to a voltage drop in the shield of about 300 Volts. In longer lines the shield voltage will increase further. High voltage can be a risk for personal safety, to decrease the shield voltage a phase adjusting impedance is connected between the cable shield and the PRS earth. The impedance is dimensioned to reduce the shield voltage to a secure level and to decrease the capacitive leakage current. The capacitance between the shield and the surrounding media is dependent on the water content in the soil. A typical value of the capacitance shield to earth is 0.15 µF/km but the value can vary along the cable but also over seasons. If no phase adjusting device between shield and earth is used the total earth current is approximately 0.4 A, for the given example. If an phase adjusting device is used the earth currents will decrease.

The supervision system measures the total current in the power cable, with the current sensor CSU. The symmetry of the coaxial cable implies that the ingoing and outgoing current is equal, but due to capacitive leakage currents the total current will not be zero. The capacitive earth current determine the trip value D1 for the relay, a typical value for the given example can be 0.4 A. If the cable is damaged or another fault occurs this will cause an additional current that will exceed the trip value D1 which activate the circuit break unit CBU. The supervision system can have an adjustable time delay, to not be affected by current transients, caused by e.g. lightning.

The CSU comprises means for measuring the phase angle between cable current and zero sequence voltage. The zero sequence voltage is measured over an impedance between the PFS neutral and earth. The voltage is determined by the capacitive leakage currents to earth and the impedance. The circuit break unit CBU is activated when the phase angle between the zero sequence voltage and the cable current exceed a given value.

All currents can be calculated approximately but due to uncertainty of earth conditions the currents should be measured in field to find optimal settings for the supervision system.

The invention is not limited to the above described and in the drawings shown embodiments but can be modified within the scope of the enclosed claims.

What is claimed is:

1. A power feeding station for delivering electrical power comprising:
    a low voltage side suitable for being connected to an electrical power source;
    a high voltage side suitable to be connected to a high voltage distribution power cable;
    a transformer for transforming the low voltage on the low voltage side to high voltage on the high voltage side; and
    a supervision system further comprising:
        a control function;
        a current sensor unit situated on the high voltage side for measuring characteristics of the current;
        means to receive characteristics of the current and means to deliver the characteristics of the current to the control function;
        safety rules suitable for governing the function of the control function;
        a circuit break unit situated on the low voltage side suitable for breaking the current;
        the control function further comprising means for receiving characteristics of the current and means for activating the circuit break unit and said control function configured to activate the circuit break unit based on the safety rules and the characteristics of the current;

the transformer configured to deliver high voltage single phase alternating current on the high voltage side; and the high voltage distribution power cable operable to distribute current-symmetrical single phase current and suitable to be connected to at least one power receiving station for receiving electrical power.

2. A power feeding station according to claim 1, wherein the high voltage distribution power cable is a coaxial cable with the shield as current return path.

3. The power feeding station according to claim 2, wherein the means for measuring characteristics of the current comprises means for measuring a value of the earth leakage current from the power cable shield to a surrounding material and means for measuring the cable shield current and where the supervision system comprises means for measuring characteristics of the current consisting of the phase angle between the earth leakage current and the cable shield current and that the supervision system is configured to take said phase angle into consideration for activation of the circuit breaker unit.

4. The power feeding station according to claim 2, further comprising a remote power system wherein impedances between the cable shield and power receiving station earth is used too reduce the shield voltage and to minimize the shield to earth capacitive currents.

5. A power feeding station according to claim 2, further comprising a remote power system for delivering electrical power;

at least one power receiving station for receiving electrical power, and a high voltage co-axial distribution power cable connected between the high voltage side of the remote power system and the power receiving station, said high voltage distribution cable operable to transmit symmetrical single phase current with the shield as current return path.

6. The power feeding station according to claim 5, wherein the high voltage distribution coaxial cable is configured to minimize a capacitive leakage current.

7. The power feeding station according to claim 1, wherein the means for measuring characteristics of the current comprises a coil without galvanic contact with the high voltage side suitable for measuring characteristics of the current.

8. The power feeding station according to claim 1, wherein the characteristics of the current comprises the difference in magnitude between incoming and outgoing current at the high voltage side and the supervision system is configured to take this value into consideration for activation of the current break unit.

9. The power feeding station according to claim 1, wherein the supervision system is configured to take a start up current of the power feeding station into consideration so that the supervision system does not activate the circuit break unit at start up.

10. The power feeding station according to claim 1, wherein the control function comprises means for delivering system information to an information unit.

11. The power feeding station according to claim 1, wherein the system information comprises characteristics of the current from the current sensor unit.

* * * * *